(12) United States Patent
Lo (10) Patent No.: US 9,154,271 B1
(45) Date of Patent: *Oct. 6, 2015

(54) METHOD AND APPARATUS FOR A PHYSICAL LAYER DEVICE (PHY) TO DETERMINE A STATUS OF A LINK IN A NETWORK

(71) Applicant: Marvell International LTD., Hamilton (BB)

(72) Inventor: William Lo, Cupertino, CA (US)

(73) Assignee: Marvell International LTD., Hamilton (BM)

( * ) Notice: Subject to any disclaimer, the term of this patent is extended or adjusted under 35 U.S.C. 154(b) by 20 days.

This patent is subject to a terminal disclaimer.

(21) Appl. No.: 14/095,433

(22) Filed: Dec. 3, 2013

Related U.S. Application Data (63) Continuation of application No. 12/945,262, filed on Nov. 12, 2010, now Pat. No. 8,599,679, which is a continuation of application No. 12/122,097, filed on May 16, 2008, now Pat. No. 7,835,269.

(60) Provisional application No. 60/938,334, filed on May 16, 2007.

(51) Int. Cl.
    *H04L 1/24* (2006.01)
    *H04L 12/26* (2006.01)

(52) U.S. Cl.
    CPC .............. *H04L 1/24* (2013.01); *H04L 43/0823* (2013.01)

(58) Field of Classification Search
    None
    See application file for complete search history.

(56) References Cited

U.S. PATENT DOCUMENTS

| 6,215,764 | B1 | 4/2001 | Wey et al. |
| 6,222,854 | B1 * | 4/2001 | Dove ............................ 370/465 |
| 2002/0083231 | A1 | 6/2002 | Chiang |
| 2002/0147569 | A1 | 10/2002 | Lay et al. |
| 2007/0047525 | A1 | 3/2007 | He |
| 2007/0248058 | A1 | 10/2007 | Fajardo et al. |

OTHER PUBLICATIONS

IEEE Std. 802.3-2002Q9, 2000 Edition 802.3Q; IEEE Standard for Information Technology—Telecommunications and information exchange between systems—Local and Metropolitan area networks—Specific requirements, Part 3: Carrier sense multiple access with collision detection (CSMA/CD) access method and physical layer specifications; Mar. 8, 2002.

\* cited by examiner

*Primary Examiner* — Gary Mui (57) ABSTRACT

A system including a monitoring module and a controller. The monitoring module is configured to monitor a link. The controller is configured to, in response to the monitoring module determining that the link is up, (i) start a first timer; (ii) indicate that the link is down in response to the monitoring module determining, prior to the first timer expiring, that the link is down; and (iii) indicate that the link is up in response to the monitoring module determining, subsequent to the first time expiring, that the link is up.

20 Claims, 9 Drawing Sheets

METHOD AND APPARATUS FOR A PHYSICAL LAYER DEVICE (PHY) TO DETERMINE A STATUS OF A LINK IN A NETWORK

CROSS-REFERENCE TO RELATED APPLICATIONS

This application is a continuation of U.S. application Ser. No. 12/945,262 (now U.S. Pat. No. 8,599,679), filed on Nov. 12, 2010 which is a continuation of U.S. application Ser. No. 12/122,097 (now U.S. Pat. No. 7,835,269), filed on May 16, 2008, which claims the benefit of U.S. Provisional Application No. 60/938,334 filed May 16, 2007. The entire disclosures of the above applications are incorporated herein by reference.

FIELD

The present invention relates generally to data communications. More particularly, the present invention relates to faster link down for data communications.

Figure 1:
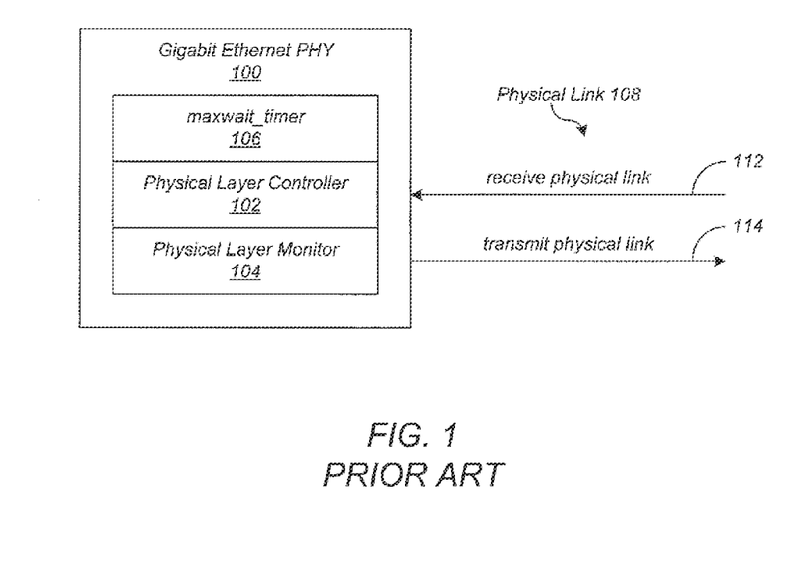
FIG. 1 shows a prior art Gigabit Ethernet PHY in accordance with IEEE standard 802.3.

Current Gigabit Ethernet (1000BASE-T) physical-layer devices (PHYs) require a significant amount of time, on the order of hundreds of milliseconds (ms) to indicate a link down condition. FIG. 1 shows a prior art Gigabit Ethernet PHY 100 in accordance with IEEE standard 802.3. Referring to FIG. 1, PHY 100 includes a physical layer controller 102, a physical layer monitor 104, and a max wait timer 106. In operation, PHY 100 is connected to a physical link 108. Physical link 108 includes a receive physical link 112 and a transmit physical link 114.

Figure 2:
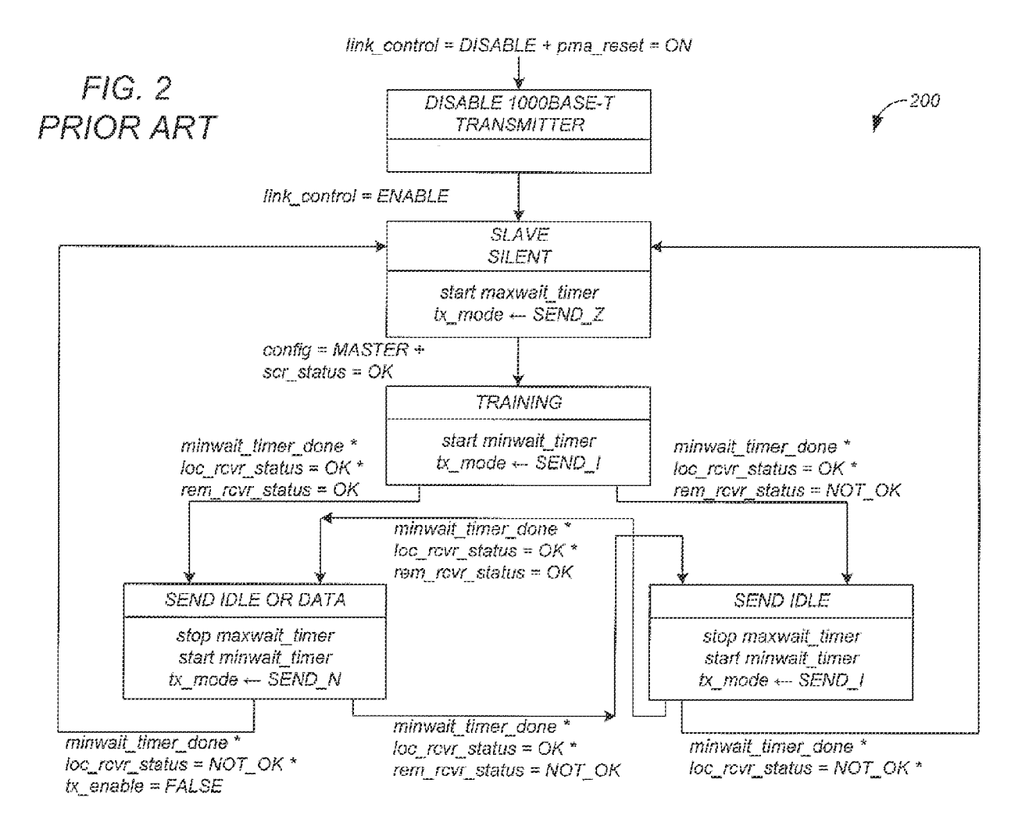
FIG. 2 shows the PHY control state machine specified by FIG. 40-15 of IEEE standard 802.3.

Physical layer controller 102 implements a PHY control state machine 200 specified by FIG. 40-15 of IEEE standard 802.3, reproduced here as FIG. 2. Referring to FIG. 2, PHY control state machine 200 starts maxwait_timer 106 when entering the SLAVE SILENT state. The maxwait_timer 106 is used by physical layer monitor 104 to indicate a link down condition.

Figure 3:
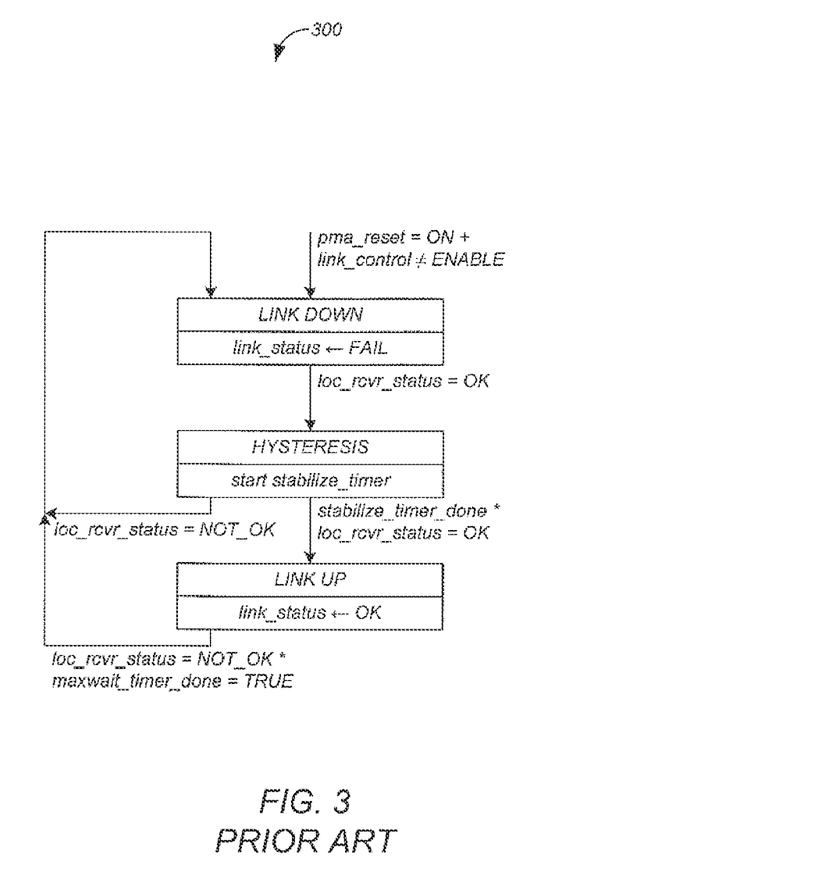
FIG. 3 shows the link monitor state machine specified by FIG. 40-16 of IEEE standard 802.3.

Physical layer monitor 104 implements a physical link monitor state machine 300 specified by FIG. 40-16 of IEEE standard 802.3, reproduced here as FIG. 3. Referring to FIG. 3, when receive physical link 112 fails (loc_rcvr_status=NOT_OK) in the LINK UP state, physical link monitor state machine 300 will not move to the LINK DOWN state, and indicate that physical link 108 has failed (link_status=FAIL) until maxwait_timer 106 expires (maxwait_timer_done=TRUE).

According to the IEEE 802.3 standard, maxwait_timer is nominally initialized to 350±5 ms when PHY 100 is configured as a SLAVE for physical link 108, and 750±5 ms when PHY 100 is configured as a MASTER. In contrast, fault-tolerant networks are generally required to detect a faulty link, and shift data transmission from the faulty link to a non-faulty link, in 50 ms or less. Clearly, the delay imposed by maxwait_timer upon the transition of physical link monitor state machine 300 from the LINK UP state to the LINK DOWN state is too long.

One possible solution is to simply initialize maxwait_timer to a lower value. However there is a danger that the loc_rcvr_status will bounce between OK and NOT_OK during initial training, resulting in a premature entry into the LINK DOWN state of FIG. 2, which will cause the link_status variable to transition from OK to FAIL. This transition will cause the auto-negotiation arbitration state machine (FIG. 28-16 of IEEE 802.3) to restart. When the arbitration state machine restarts, the link_control variable is set to DISABLE, which resets the IEEE 802.3 state machines shown in FIGS. 1 and 2.

SUMMARY

In general, in one aspect, an embodiment features an apparatus comprising: a physical layer controller adapted to start a first timer for a physical link comprising a receive physical link; and a physical link monitor comprising a monitor module adapted to determine a local receiver status for the receive physical link, and a controller adapted to indicate a link status is OK for the physical link when the local receiver status is OK, wherein the controller comprises a speed up mode circuit to indicate the link status is FAIL for the physical link when the local receiver status is not OK and a speed up mode is enabled, regardless of the status of the first timer.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DESCRIPTION

Embodiments of the present invention provide fast link down detection and indication for network devices such as Gigabit Ethernet devices. However, while embodiments of the present invention are described in terms of Gigabit Ethernet devices, embodiments of the present invention apply to other sorts of network devices as well, as will be apparent from the disclosure and teachings provided herein. Some embodiments of the present invention are otherwise compliant with all or part of IEEE standard 802.3, the disclosure thereof incorporated by reference herein in its entirety.

Figure 4:
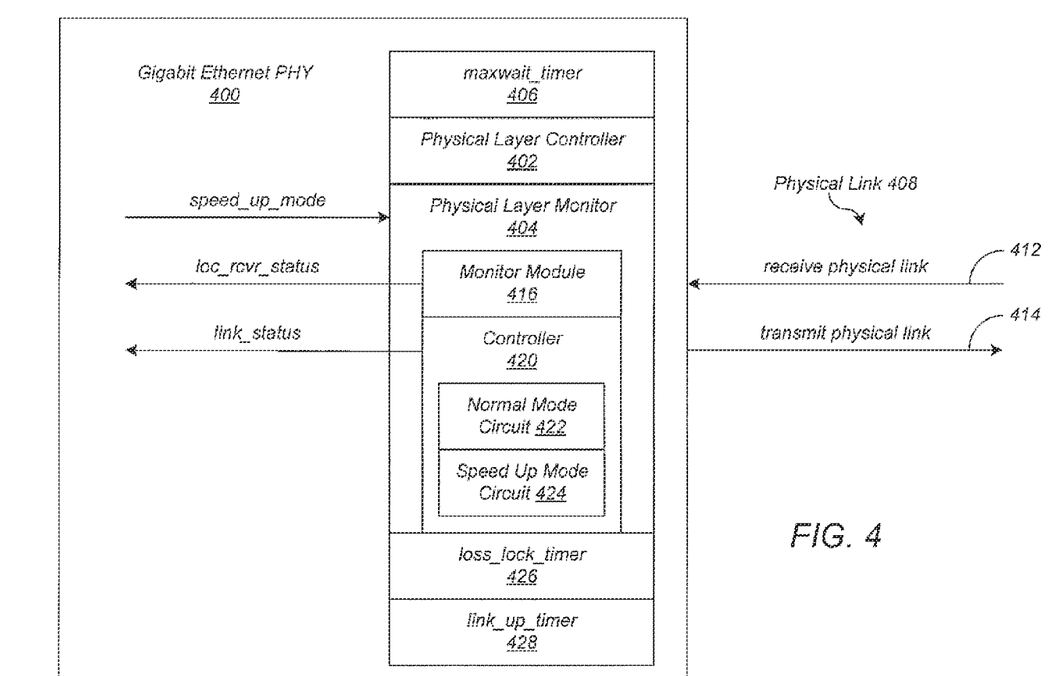
FIG. 4 shows a Gigabit Ethernet PHY according to an embodiment of the present invention.

FIG. 4 shows a Gigabit Ethernet PHY 400 according to an embodiment of the present invention. Although in the described embodiments, the elements of Gigabit Ethernet PHY 400 are presented in one arrangement, other embodiments may feature other arrangements, as will be apparent to one skilled in the relevant arts based on the disclosure and teachings provided herein. For example, the elements of Gigabit Ethernet PHY 400 can be implemented in hardware, software, or combinations thereof. Gigabit Ethernet PHY 400 can be implemented as a network device such as a switch, router, network bridge, network interface controller (NIC), and the like.

Referring to FIG. 4, PHY 400 includes a physical layer controller 402, a physical layer monitor 404, and a maxwait_timer 406. In operation, PHY 400 is connected to a physical link 408. Physical link 408 includes a receive physical link 412 and a transmit physical link 414.

Physical layer controller 402 implements a PHY control state machine such as that specified by FIG. 40-15 of IEEE standard 802.3, reproduced here as FIG. 2. Referring to FIG. 2, PHY control state machine 200 starts maxwait_timer 406 when entering the SLAVE SILENT state. The maxwait timer 406 is used by physical layer monitor 404 to indicate a link down condition.

Physical layer monitor 404 includes a monitor module 416 adapted to determine a local receiver status (loc_rcvr_status) for receive physical link 412, and a controller 420 adapted to indicate a link status (link_status) for physical link 408 in accordance with a speed up mode signal (speed_up_mode), a loss lock timer (loss_lock_timer) 426, and a link up timer (link_up_timer) 428. Controller 420 includes a normal mode circuit 422 and a speed up mode circuit 424. Normal mode circuit 422 is adapted to indicate the link status is FAIL for physical link 408 when the local receiver status is not OK, maxwait_timer 406 expires, and speed up mode is disabled (ioc_rcvr_status=NOT_OK*maxwait_timer_done*speed_up=disabled). Speed up mode circuit 424 is adapted to indicate the link status is FAIL for physical link 408 when the local receiver status is not OK and the speed up mode is enabled (loc_rcvr_status=NOT_OK*speed_up=disabled). Note that in speed up mode, max wait timer 406 is not used to delay indication of the failure of physical link 408.

Figure 5:
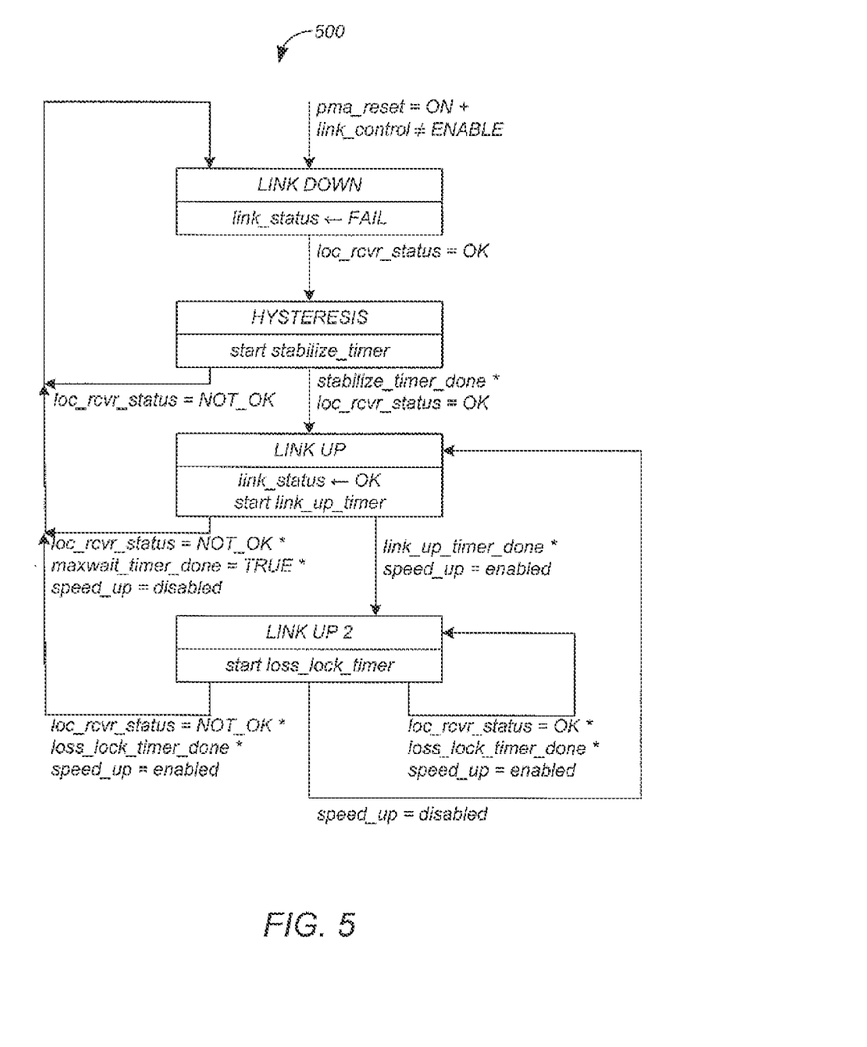
FIG. 5 shows a physical link monitor state machine for the Gigabit Ethernet PHY of FIG. 4 according to an embodiment of the present invention.

Controller 420 implements a physical link monitor state machine 500 according to an embodiment of the present invention, as shown in FIG. 5. Referring to FIG. 5, state machine 500 enters a LINK DOWN state when pma-reset-ON+link_control 4-ENABLE, as specified by IEEE standard 802.3. When state machine 500 enters the LINK DOWN state, controller 420 asserts link_status=FAIL.

However, when monitor module 416 determines the local receiver status is OK (loc rcvr_status=OK), state machine 500 moves to a HYSTERESIS state. When state machine 500 enters the HYSTERESIS state, controller 420 starts a stabilize timer (start stabilize_timer). If during the HYSTERESIS state, monitor module 416 determines the local receiver status is not OK (loc_rcvr_status=NOT_OK), state machine 500 returns to the LINK DOWN state. But if, when the stabilize timer expires, the local receiver status is OK (stabilize_timer_done*loc_rcvr_status=OK), state machine 500 moves to a LINK UP state.

When state machine 500 enters the LINK UP state, controller 420 asserts link_status=OK, and starts link up timer 428 (start link_up_timer). For example, link up timer 428 can be initialized to one second or more to ensure that the local receiver status (loc_rcvr_status) has stabilized. Exit from the LINK UP state depends on the speed up mode signal (speed_up_mode).

If during the LINK UP state, speed up mode is disabled, monitor module 416 determines the local receiver status is not OK, and maxwait_timer 406 expires (loc_rcvr_status=NOT_OK*maxwait_timer_done=TRUE*speed_up=disabled), then state machine 500 returns to the LINK DOWN state. But if during the LINK UP state, speed up mode is enabled and iink_up_timer 428 expires (link_up_timer_done*speed_up=enabled), state machine 500 moves to a LINK UP 2 state.

When state machine 500 enters the LINK UP 2 state, controller 420 starts a loss lock timer 426 (start loss_lock_timer). For example, loss lock timer 426 can be initialized to less than 50 ms (or even to 0 ms) to ensure a rapid transition to the LINK DOWN state when the local receiver status is not OK (loc_rcvr_status=NOT_OK). Exit from the LINK UP 2 state also depends on the speed up mode signal (speed_up_mode).

If during the LINK UP 2 state, speed up mode is disabled (speed-up=disabled), then state machine 500 returns to the LINK UP state. And if during the LINK UP 2 state, speed up mode is enabled and the local receiver status is OK when loss lock timer 426 expires (loc_rcvr_status=OK*loss_lock_timer_done*speed_up=enabled), state machine 500 returns to the LINK UP 2 state. But if during the LINK UP 2 state, speed up mode is enabled and the local receiver status is not OK when loss lock timer 426 expires (loc rcvr status=NOT_OK*loss_lock_timer_done*speed_up=enabled), state machine 500 returns to the LINK DOWN state regardless of the status of maxwait_timer 406. Note that this transition is governed by loss_lock_timer 426 rather than maxwait_timer 406. Therefore Gigabit Ethernet PHY 400 achieves fast link down detection and indication.

Figure 6:
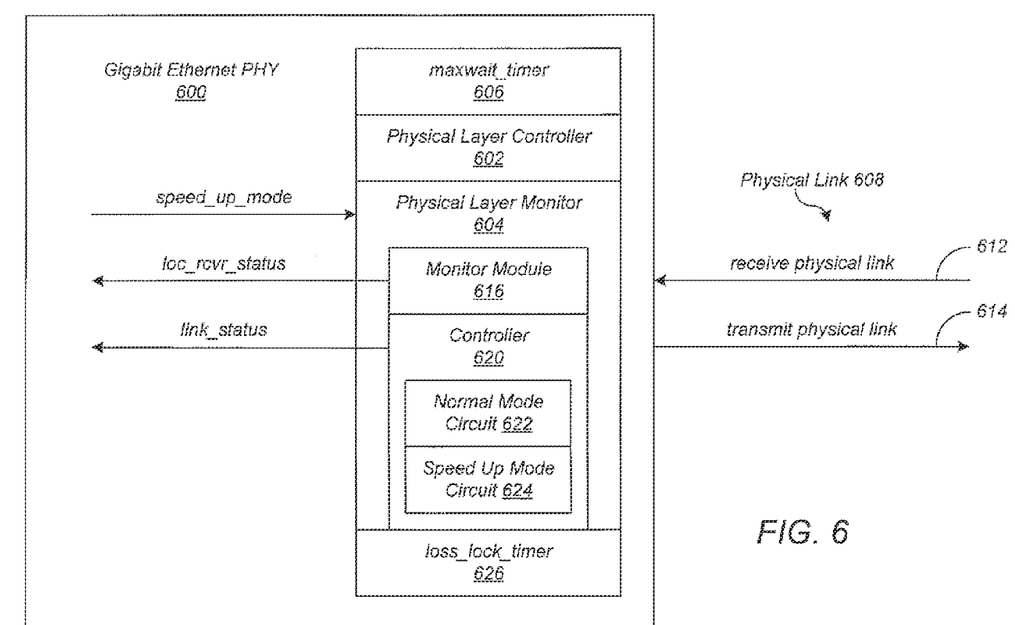
FIG. 6 shows a Gigabit Ethernet PHY that does not employ a link up_timer according to an embodiment of the present invention.

In some embodiments, link_up_timer 428 is not used. FIG. 6 shows a Gigabit Ethernet PHY 600 according to such an embodiment of the present invention. Although in the described embodiments, the elements of Gigabit Ethernet PHY 600 are presented in one arrangement, other embodiments may feature other arrangements, as will be apparent to one skilled in the relevant arts based on the disclosure and teachings provided herein. For example, the elements of Gigabit Ethernet PHY 600 can be implemented in hardware, software, or combinations thereof. Gigabit Ethernet PHY 600 can be implemented as a network device such as a switch, router, network bridge, network interface controller (NIC), and the like.

Referring to FIG. 6, PHY 600 includes a physical layer controller 602, a physical layer monitor 604, and a maxwait_timer 606. In operation, PHY 600 is connected to a physical link 608. Physical link 608 includes a receive physical link 612 and a transmit physical link 614.

Physical layer controller 602 implements a PHY control state machine such as that specified by FIG. 40-15 of IEEE standard 802.3, reproduced here as FIG. 2. Referring to FIG. 2, PHY control state machine 200 starts maxwait_timer 606 when entering the SLAVE SILENT state. The maxwait timer 606 is used by physical layer monitor 604 to indicate a link down condition.

Physical layer monitor 604 includes a monitor module 616 adapted to determine a local receiver status (loc_rcvr_status) for receive physical link 612, and a controller 620 adapted to indicate a link status (link_status) for physical link 608 in accordance with a speed up mode signal (speed_up_mode), and a loss lock timer (loss_lock_timer) 626. Controller 620 includes a normal mode circuit 622 and a speed up mode circuit 624. Normal mode circuit 622 is adapted to indicate the link status is FAIL for physical link 608 when the local receiver status is not OK, maxwait_timer 606 expires, and speed up mode is disabled (loc_rcvr_status=NOT_OK*maxwait_timer_done*speed_up=disabled). Speed up mode circuit 624 is adapted to indicate the link status is FAIL for physical link 608 when the local receiver status is not OK and the speed up mode is enabled (loc_rcvr_status=NOT_OK*speed_up=disabled). Note that in speed up mode, maxwaittimer 606 is not used to delay indication of the failure of physical link 608.

Figure 7:
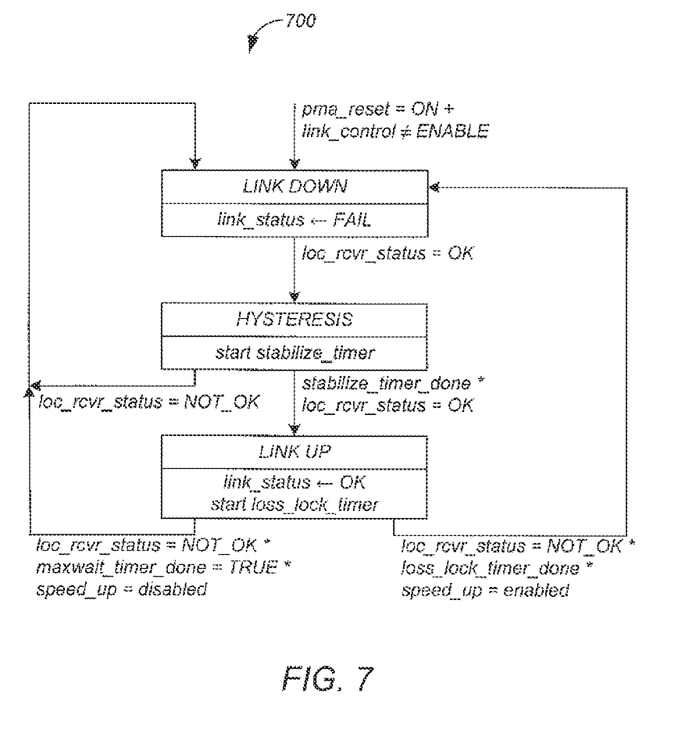
FIG. 7 shows a physical link monitor state machine for the Gigabit Ethernet PHY of FIG. 6 according to an embodiment of the present invention.

Controller 620 implements a physical link monitor state machine 700 according to an embodiment of the present invention, as shown in FIG. 7. Referring to FIG. 7, state machine 700 enters a LINK DOWN state when pma_reset=ON+link control 4-ENABLE, as specified by IEEE standard 802.3. When state machine 700 enters the LINK DOWN state, controller 620 asserts link_status=FAIL.

However, when monitor module 616 determines the local receiver status is OK (loc_rcvr_status=OK), state machine 700 moves to a HYSTERESIS state. When state machine 700 enters the HYSTERESIS state, controller 620 starts a stabilize timer (start stabilize_timer). If during the HYSTERESIS state, monitor module 616 determines the local receiver status is not OK (loc_rcvr_status=NOT_OK), state machine 700 returns to the LINK DOWN state. But if, when the stabilize timer expires, the local receiver status is OK (stabilize_timer_done*loc_rcvr_status=OK), state machine 700 moves to a LINK UP state.

When state machine 700 enters the LINK UP state, controller 620 asserts link_status=OK, and starts loss lock timer 626 (start loss locktimer). For example, loss lock timer 626 can be initialized to less than 50 ms (or even to 0 ms) to ensure a rapid transition to the LINK DOWN state when the local receiver status is not OK (loc_rcvr_status=NOT_OK). Exit from the LINK UP state also depends on the speed up mode signal (speed_up_mode).

If during the LINK UP state, speed up is disabled, monitor module 616 determines the local receiver status is not OK, and maxwait_timer 606 expires (loc_rcvr_status= NOTOK*maxwait_timer_done=TRUE*speed_up disabled), then state machine 700 returns to the LINK DOWN state. But if during the LINK UP state, speed up mode is enabled and the local receiver status is not OK when loss lock timer 626 expires (loc_rcvr_status=NOT_OK*loss_lock_timer_done*speed_up=enabled), state machine 700 returns to the LINK DOWN state regardless of the status of maxwait tinier 606. Note that this transition is governed by loss_lock_timer 626 rather than maxwait_timer 606. Therefore Gigabit Ethernet PHY 600 achieves fast link down detection and indication.

Figure 8:
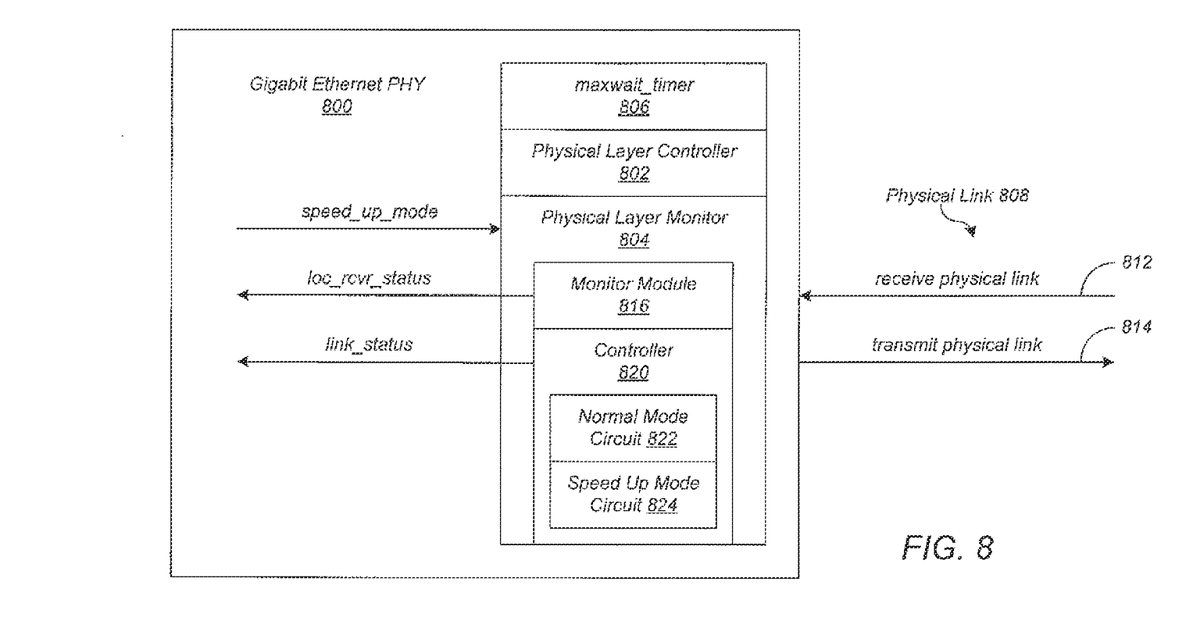
FIG. 8 shows a Gigabit Ethernet PHY that employs neither a link_up_timer nor a loss_lock_timer according to an embodiment of the present invention.

In some embodiments, neither link_up_timer 428 nor loss_lock_timer 426 are used. FIG. 8 shows a Gigabit Ethernet PHY 800 according to such an embodiment of the present invention. Although in the described embodiments, the elements of Gigabit Ethernet PHY 800 are presented in one arrangement, other embodiments may feature other arrangements, as will be apparent to one skilled in the relevant arts based on the disclosure and teachings provided herein. For example, the elements of Gigabit Ethernet PHY 800 can be implemented in hardware, software, or combinations thereof. Gigabit Ethernet PHY 800 can be implemented as a network device such as a switch, router, network bridge, network interface controller (NIC), and the like.

Referring to FIG. 8, PHY 800 includes a physical layer controller 802, a physical layer monitor 804, and a maxwait_timer 806. In operation, PHY 800 is connected to a physical link 808. Physical link 808 includes a receive physical link 812 and a transmit physical link 814.

Physical layer controller 802 implements a PHY control state machine such as that specified by FIG. 40-15 of IEEE standard 802.3, reproduced here as FIG. 2. Referring to FIG. 2, PHY control state machine 200 starts maxwait_timer 806 when entering the SLAVE SILENT state. The maxwait_timer 806 is used by physical layer monitor 804 to indicate a link down condition.

Physical layer monitor 804 includes a monitor module 816 adapted to determine a local receiver status (loc_rcvr_status) for receive physical link 812, and a controller 820 adapted to indicate a link status (link_status) for physical link 808 in accordance with a speed up mode signal (speed_up_mode). Controller 820 includes a normal mode circuit 822 and a speed up mode circuit 824. Normal mode circuit 822 is adapted to indicate the link status is FAIL for physical link 808 when the local receiver status is not OK, maxwait_timer 806 expires, and speed up mode is disabled (loc rcvr status=NOT_OK*maxwait_timer_done*speed_up=disabled). Speed up mode circuit 824 is adapted to indicate the link status is FAIL for physical link 808 when the local receiver status is not OK and the speed up mode is enabled (loc_rcvr_status=NOT_OK*speed_up=disabled). Note that in speed up mode, maxwait timer 806 is not used to delay indication of the failure of physical link 808.

Figure 9:
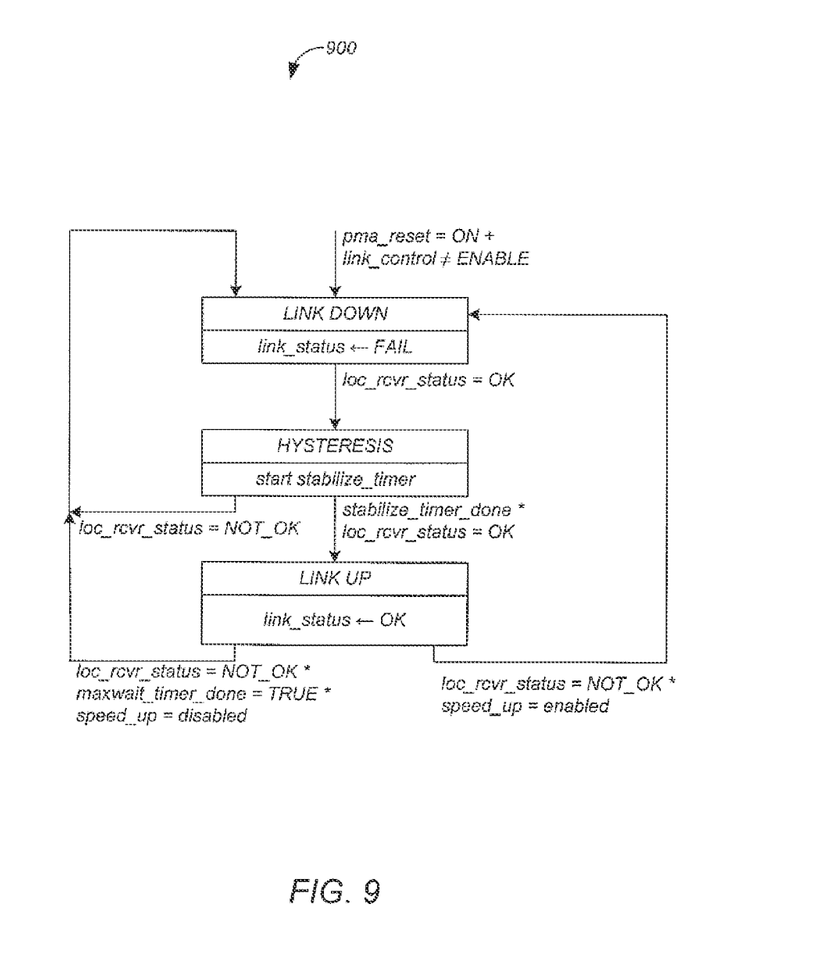
FIG. 9 shows a physical link monitor state machine for the Gigabit Ethernet PHY of FIG. 8 according to an embodiment of the present invention.

Controller 820 implements a physical link monitor state machine 900 according to an embodiment of the present invention, as shown in FIG. 9. Referring to FIG. 9, state machine 900 enters a LINK DOWN state when pma_reset=ON+link control 4 ENABLE, as specified by IEEE standard 8023. When state machine 900 enters the LINK DOWN state, controller 820 asserts linl<_status=FAIL.

However, when monitor module 816 determines the local receiver status is OK (loc_rcvr_status-OK), state machine 900 moves to a HYSTERESIS state. When state machine 900 enters the HYSTERESIS state, controller 820 starts a stabilize timer (start stabilize_timer). If during the HYSTERESIS state, monitor module 816 determines the local receiver status is not OK (loc_rcvr_status=NOT_OK), state machine 900 returns to the LINK DOWN state. But if, when the stabilize timer expires, the local receiver status is OK (stabilize_timer_done*loc rcvr status~OK), state machine 900 moves to a LINK UP state.

When state machine 900 enters the LINK UP state, controller 820 asserts link_status~OK. Exit from the LINK UP state also depends on the speed up mode signal (speed_up mode).

If during the LINK UP state, speed up mode is disabled, monitor module 816 determines the local receiver status is not OK, and maxwait_timer 806 expires (loc_rcvr_status—NOT OK*maxwait_timer_done=TRUE*speed_up=disabled), then state machine 900 returns to the LINK DOWN state. But if during the LINK UP state, speed up mode is enabled and the local receiver status is not OK (loc_rcvr_status=NOT_OK*speed_up=enabled), state machine 900 returns to the LINK DOWN state regardless of the status of maxwait_timer 706. Note that this transition is not governed by maxwait_timer 806. Therefore Gigabit Ethernet PHY 800 achieves fast link down detection and indication.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A system comprising:
a monitoring module configured to monitor a link; and
a controller configured to, in response to the monitoring module determining that the link is up,
start a first timer;
indicate that the link is down in response to the monitoring module determining, prior to the first timer expiring, that the link is down; and
indicate that the link is up in response to the monitoring module determining, subsequent to the first timer expiring, that the link is up.

2. The system of claim 1, wherein:
the controller is configured to operate in a first mode or a second mode;
in the first mode, in response to the monitoring module determining that the link is down, the controller is configured to indicate that the link is down subsequent to expiration of a predetermined time period; and
in the second mode, in response to the monitoring module determining that the link is down, the controller is configured to indicate that the link is down prior to the expiration of the predetermined time period.

3. The system of claim 2, wherein subsequent to the controller indicating that the link is up, the controller is configured to indicate that the link is down in response to (i) the controller operating in the first mode, (ii) the monitoring module determining that the link is down, and (iii) expiration of the predetermined time period.

4. The system of claim 2, wherein subsequent to the controller indicating that the link is up, the controller is configured to:
start a second timer, wherein a duration of the second timer is greater than the predetermined time period; and
indicate that the link is up in response to (i) the controller operating in the second mode, and (ii) expiration of the second timer.

5. The system of claim 4, wherein subsequent to the expiration of the second timer, the controller is configured to:
start a third timer, wherein a duration of the third timer is less than the predetermined time period; and
indicate that the link is down, regardless of expiration of the predetermined time period, in response to (i) the controller operating in the second mode, and (ii) the monitoring module determining that the link is down at the expiration of the third timer.

6. The system of claim 4, wherein subsequent to the expiration of the second timer, the controller is configured to:
start a third timer, wherein a duration of the third timer is less than the predetermined time period; and
in response to (i) the controller operating in the second mode, and (ii) the monitoring module determining that the link is up at the expiration of the third timer, restart the third timer.

7. The system of claim 4, wherein subsequent to the expiration of the second timer, the controller is configured to restart the second timer in response to the controller operating in the first mode.

8. The system of claim 2, wherein subsequent to the controller indicating that the link is up, the controller is configured to:
start a second timer, wherein a duration of the second timer is less than the predetermined time period; and
indicate that the link is down, regardless of expiration of the predetermined time period, in response to (i) the controller operating in the second mode, and (ii) the monitoring module determining that the link is down at the expiration of the second timer.

9. The system of claim 2, wherein subsequent to the controller indicating that the link is up, the controller is configured to:
indicate that the link is down, regardless of expiration of the predetermined time period, in response to (i) the controller operating in the second mode, and (ii) the monitoring module determining that the link is down.

10. A physical layer device comprising the system of claim 1.

11. A network device comprising the physical layer device of claim 10.

12. A method comprising:
monitoring a link of a network device to a network to determine whether the link is up or down; and
in response to determining that the link is up,
starting a first timer;
indicating that the link is down in response to determining, prior to the first timer expiring, that the link is down; and
indicating that the link is up in response to determining, subsequent to the first timer expiring, that the link is up.

13. The method of claim 12, further comprising:
operating in a first mode or a second mode;
in the first mode, in response to determining that the link is down, indicating that the link is down subsequent to expiration of a predetermined time period; and
in the second mode, in response to determining that the link is down, indicating that the link is down prior to the expiration of the predetermined time period.

14. The method of claim 13, further comprising, subsequent to indicating that the link is up, indicating that the link is down in response to (i) operating in the first mode, (ii) determining that the link is down, and (iii) expiration of the predetermined time period.

15. The method of claim 13, further comprising, subsequent to indicating that the link is up:

starting a second timer, wherein a duration of the second timer is greater than the predetermined time period; and indicating that the link is up in response to (i) operating in the second mode, and (ii) expiration of the second timer.

16. The method of claim 15, further comprising, subsequent to the expiration of the second timer:

starting a third timer, wherein a duration of the third timer is less than the predetermined time period; and indicating that the link is down, regardless of expiration of the predetermined time period, in response to (i) operating in the second mode, and (ii) determining that the link is down at the expiration of the third timer.

17. The method of claim 15, further comprising, subsequent to the expiration of the second timer:

starting a third timer, wherein a duration of the third timer is less than the predetermined time period; and in response to (i) operating in the second mode, and (ii) determining that the link is up at the expiration of the third timer, restarting the third timer.

18. The method of claim 15, further comprising, subsequent to the expiration of the second timer, restarting the second timer in response to operating in the first mode.

19. The method of claim 13, further comprising, subsequent to indicating that the link is up:

starting a second timer, wherein a duration of the second timer is less than the predetermined time period; and indicating that the link is down, regardless of expiration of the predetermined time period, in response to (i) operating in the second mode, and (ii) determining that the link is down at the expiration of the second timer.

20. The method of claim 13, further comprising, subsequent to indicating that the link is up:

indicating that the link is down, regardless of expiration of the predetermined time period, in response to (i) operating in the second mode, and (ii) determining that the link is down.

* * * * *